J. YOUNG.
Rotary Cultivator.

No. 5,665.

Patented July 11, 1848.

UNITED STATES PATENT OFFICE.

JAMES YOUNG, OF JEFFERSON, ASSIGNOR TO WILLIAM YOUNG, OF WASHINGTON, MAINE.

IMPROVEMENT IN ROTARY PLOWS.

Specification forming part of Letters Patent No. 5,665, dated July 11, 1848.

*To all whom it may concern:*

Be it known that I, JAMES YOUNG, of Jefferson, in the county of Lincoln and State of Maine, have invented a new and Improved Plowing or Spading Machine, which I denominate a "Rotary Plow;" and I do hereby declare the following to be a full, clear, and exact description thereof, reference being had to the accompanying drawings, making a part of this specification.

The nature of my invention consists in the combination of a series of spade or plow plates with and between a couple of wheels with cutting plates projecting from their bearing-rims in such a manner that as the wheels are revolved and the cutting-plates radiating therefrom penetrate the earth the spade or plow plates will enter and loosen the earth between the wheels in a manner similar to that performed by hand-spading.

Figure 1:
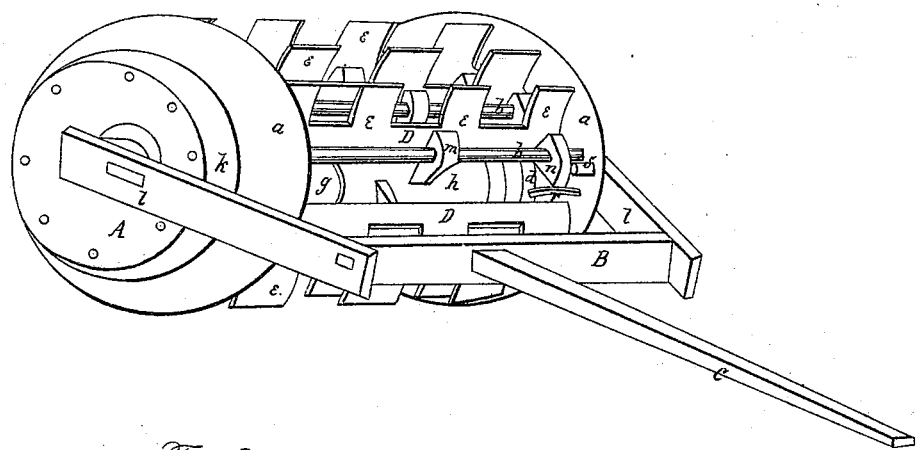
Figure 2:
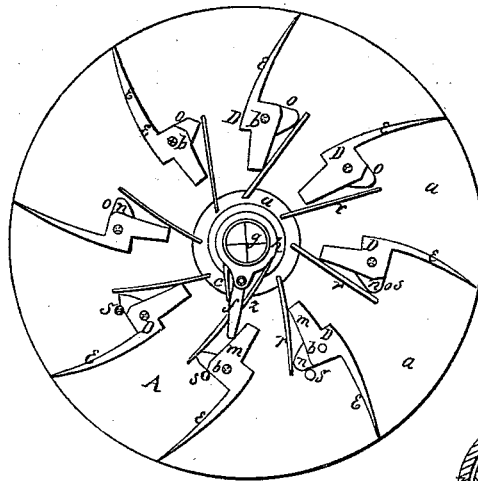
Figure 3:
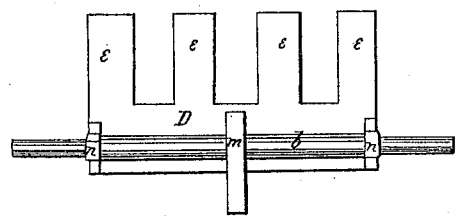
Figure 5:
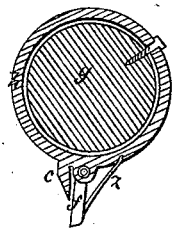
Figure 4:
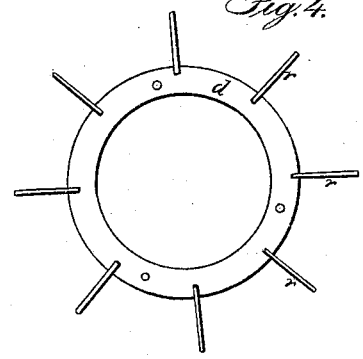

In the accompanying drawings, Figure 1 is a perspective view of my rotary plow; Fig. 2, a vertical section thereof; and Figs. 3, 4, and 5, detached portions of the same.

Similar letters indicate like parts in all the figures.

The wheels A A, I generally make of from four to six feet in diameter, and construct them of such material as will give them the requisite weight and strength. The wheels are placed upon journals, on which they revolve at the ends of the axle-tree $g$. The operating-tongue C is connected to the extremities of the axle-tree $g$ by means of the transverse piece B and the arms $l\ l$, as shown in Fig. 1.

$a\ a$ are the cutting annular plates secured to the inner sides of the wheels, and radiating beyond their bearing-rims $k\ k$ a distance equal to the depth that the earth is required to be stirred by the spade or plow plates $e\ e$. The wheels A A are firmly and securely fastened to each other by means of the series of connecting-rods $b\ b$, series of spades or plow-plates $e\ e$ are placed upon and supported by each of the connecting-rods $b\ b$, as shown in Figs. 1 and 2. The spade or plow plates $e\ e$ are welded or riveted to bars D. The bars D have lugs or short arms $n\ n$ secured to and projecting at right angles from each end, which lugs or arms have apertures formed in them for the reception of their supporting-rods $b\ b$.

To the central portion of each bar D there is secured an arm, $m$, which projects rearward therefrom in a right-angular direction to that of the arms $n\ n$. To the central portion of the axle-tree $g$ there is secured a ring, $h$, to the periphery of which there is jointed the stop $f$, descending vertically below the axle-tree. The stop $f$ is acted upon on its rear side by a permanent shoulder, $c$, and on its front side by the spring $z$.

To the inner side of each of the wheels A there is permanently secured a ring, $d$, surrounding the axle-tree $g$. From these rings radiate the series of elastic arms $r\ r$, which bear against the inner sides of the arms $n\ n$, (projecting from the bars D,) and serve to keep their front surfaces in contact with the reacting-pins $s\ s$, projecting from the inner sides of the wheels.

The operation of my rotary plow is as follows: When the machine is drawn forward the cutting-blades projecting from the rim of the wheels and the spade or plow plates projecting from the bars D will be forced into the earth by the weight of the machine, and as the wheels rotate the arm $m$, projecting from the center of each of the plow-bars D, will come in contact with the stop $f$, descending from the center of the axle-tree, which will tilt the plow or spade plates, throwing up their points and discharging the earth therefrom. As soon as the stationary stop $f$ has ceased to act upon the arm $m$ of one of the plow-bars D in consequence of its forward movement, the elastic arms $r\ r$ will act upon the arms $n\ n$ of the bars D and throw back the plow or spade plates into the proper position for entering the ground again, as represented in Fig. 2, in which position the front edges of the arms $n\ n$ will bear against the pins $s\ s$.

The spade or plow plates $e\ e$ are so arranged upon the bars D that the plates upon one of the bars and the spaces between the same will alternate with those on the bar that next succeeds it.

Having thus fully described my improved rotary plow, what I claim as new, and desire to secure by Letters Patent, is—

1. The combination, substantially as herein set forth, of the several series of spade or plow plates $e\ e$ with the cutter-wheels A A.

2. The manner of operating the spade or plow plates by means of the arms $m$ and $n\ n$, projecting from each plow-bar D, the stop $f$, descending from the axle-tree, the elastic arms $r\ r$, radiating from the rings $d\ d$, secured to the inner sides of the wheels, and the pins $s\ s$, projecting from the inner sides of the wheels, substantially as herein set forth, not intending by this claim to limit myself to the exact number, proportion, and arrangement of plow or spade plates, as herein set forth and represented, but shall vary the same as I may deem expedient, while I attain the same end by substantially the same means.

JAMES YOUNG.

Witnesses:
   B. F. CHANDLER,
   BENJ. A. G. FULLER.